United States Patent

Warrick et al.

[11] Patent Number: 5,857,247
[45] Date of Patent: Jan. 12, 1999

[54] BUCKLE SYSTEM FOR MANUAL OR AUTOMATIC RELEASE OF CREW MEMBER HARNESS FROM PARACHUTE

[75] Inventors: James C. Warrick, Prescott; Jason L. Bulle, Scottsdale, both of Ariz.

[73] Assignee: H. Koch & Son, Inc., Anaheim, Calif.

[21] Appl. No.: 995,850

[22] Filed: Dec. 22, 1997

[51] Int. Cl.⁶ .................................................. A44B 11/25
[52] U.S. Cl. ................................ 24/603; 24/645; 24/632
[58] Field of Search .......................... 24/645, 650, 603, 24/647, 696, 643, 633, 632; 244/151 B, 151 A

[56] References Cited

U.S. PATENT DOCUMENTS

| | | | |
|---|---|---|---|
| 3,183,568 | 5/1965 | Gaylord | 24/645 |
| 3,658,281 | 4/1972 | Gaylord | 24/632 X |
| 3,744,102 | 7/1973 | Gaylord | 24/603 |
| 3,744,103 | 7/1973 | Gaylord | 24/603 |
| 3,766,611 | 10/1973 | Gaylord | 24/603 |
| 3,964,138 | 6/1976 | Gaylord | 24/645 |
| 4,095,313 | 6/1978 | Piljay et al. | 24/603 |
| 4,185,363 | 1/1980 | David | 24/645 |
| 5,097,572 | 3/1992 | Warrick | 24/645 |

*Primary Examiner*—Anthony Knight
*Assistant Examiner*—Robert J. Sandy

[57] ABSTRACT

A buckle system for release of a crew member's harness from a parachute. The buckle system has a frame which holds the harness. A tang assembly holds the parachute strap and snaps into the frame. The tang assembly is held by a latch which pivots between a closed position and an open position. The latch in turn is held by a lever which includes a cavity which holds the free end of the latch. When the lever is moved to an open position the latch is released. The latch has a spring which urges it into an open position. The result is a buckle system which can be opened with very little force being exerted on the lever. The lever is covered by a spring loaded cover. An automatic release is provided wherein a pyrotechnic charge opens the cover and lever and thereby releases the latch.

16 Claims, 12 Drawing Sheets

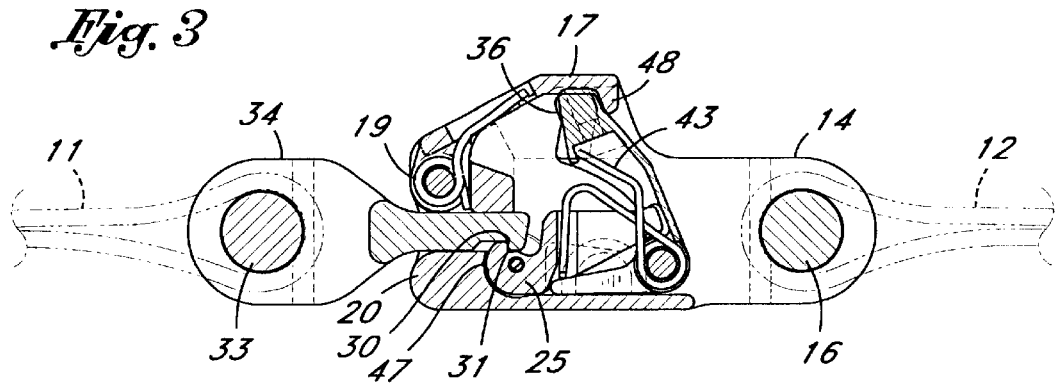
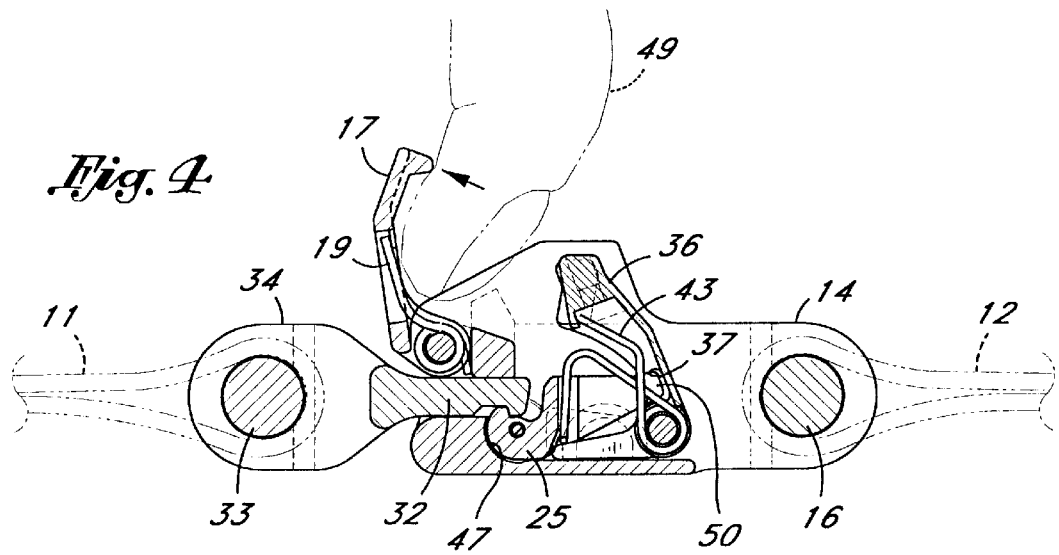
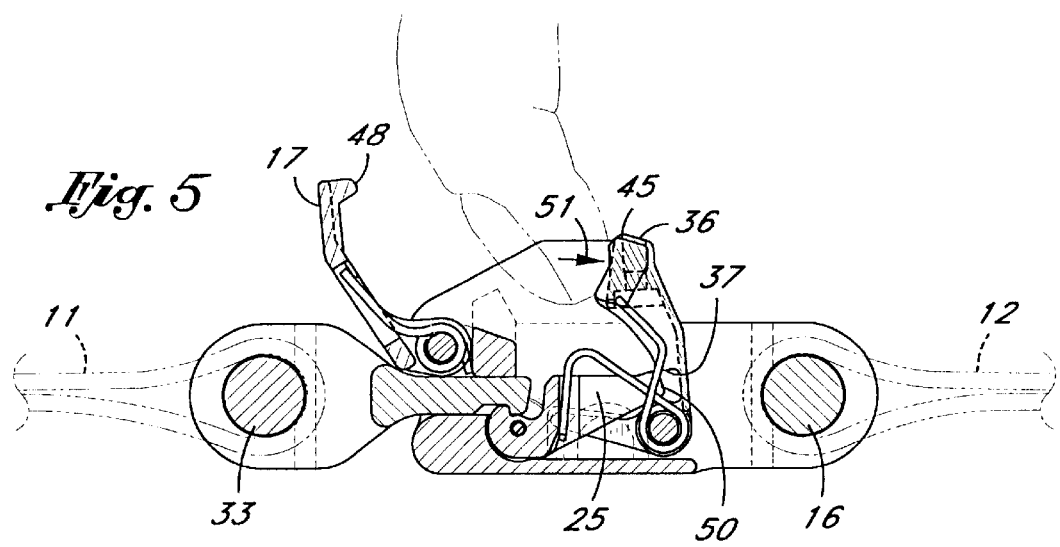

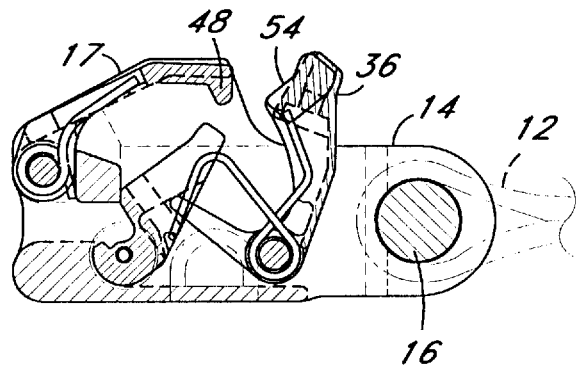
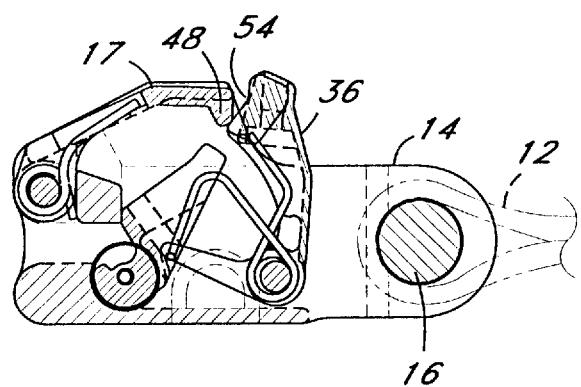
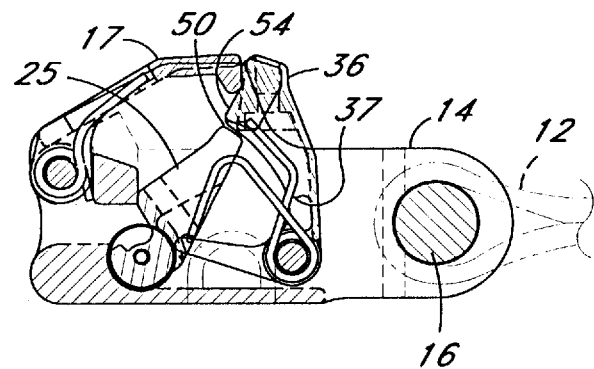

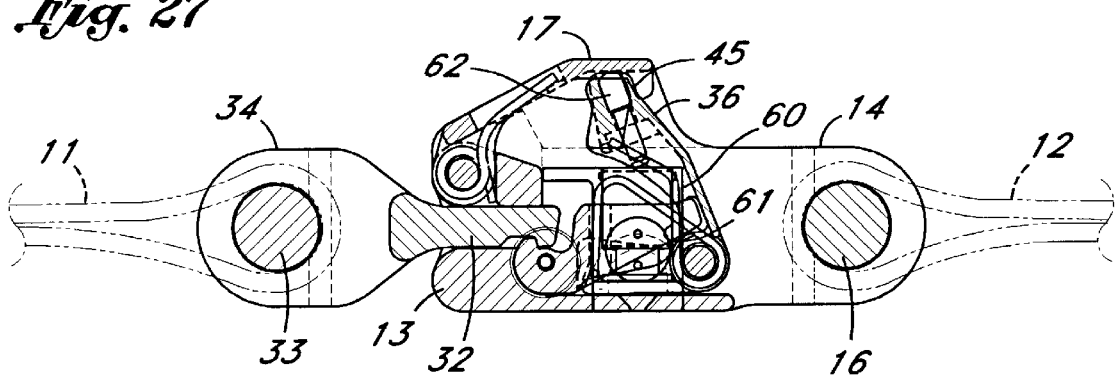
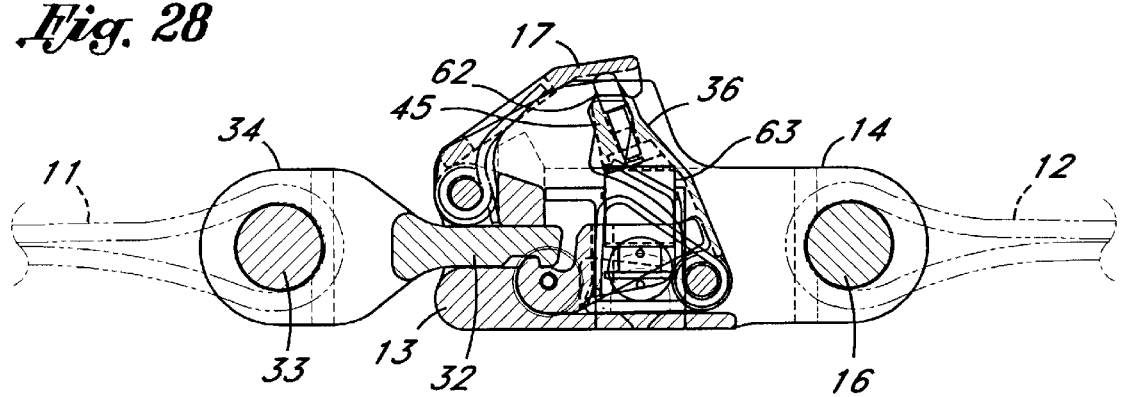

BUCKLE SYSTEM FOR MANUAL OR AUTOMATIC RELEASE OF CREW MEMBER HARNESS FROM PARACHUTE

BACKGROUND OF THE INVENTION

The field of the invention is harnesses and the invention relates more particularly to harnesses of the type used by the crew of an aircraft.

Numerous harness release buckles are known. One early version utilizing a tang and latch assembly is shown in U.S. Pat. No. 3,183,568 to J. A. Gaylord and assigned to the assignee of the present invention. A more recent tang and latch assembly is shown in U.S. Pat. No. 5,097,572. Numerous other tang and latch mechanisms are shown in U.S. Pat. Nos. 3,658,281, 3,964,138, 4,095,313, and 4,185,363.

One of the problems with all of the above patents is the difficulty in trying to release the canopy from the harness when the canopy is under a great force such as occurring when a crew member is being dragged along the ground on a windy day. For instance, when referring to U.S. Pat. No. 3,183,568, the handle or yoke 18 has teeth 24 which fit into slots 26 in shaft 8. Thus, in order to turn shaft 8, the yoke is turned, but as shown in FIG. 5, the prong 6 is abutting directly against the shaft 8 and, if the prong is under a very heavy load, it is difficult to turn yolk 18. This same shortcoming exists in U.S. Pat. No. 5,097,572 where the engagement surface 33 of notch 28 abuts shoulder 32 and makes it difficult to rotate the handle 36.

SUMMARY OF THE INVENTION

The present invention is for a buckle system for release of a harness. The buckle system includes a harness loop securement pin and a parachute loop securement pin. A frame has two arms and a cross member the two arms hold the harness loop securement pin. A lever having a pivoted end and a free end is pivotally held to the frame and moveable from a closed position to an open position. The lever is biased toward a closed position and the lever includes a latch holding ledge. The latch is held by the frame and pivoted between a closed position and an open position. When it is in the closed position, the free end of the latch fits into the latch holding ledge of the lever. The latch also has a tang holding tooth which engages a tang when the latch is in a closed position and releases the tang when the latch is in an open position. The latch is biased toward an open position. Thus, when the lever is opened, there is very little pressure on the lever to release the latch. The latch springs open easily releasing the tang. Preferably a cover member is pivotally attached to the frame and covers the lever. The cover is biased into a closed position. The buckle system is also provided with a pyrotechnic release mechanism which may be built into the buckle system. The pyrotechnic release system includes a cylinder and a piston. When the piston is fired out of the cylinder, it pushes the cover open, the lever open, thereby releasing the latch and releasing the tang and its associated canopy harness.

BRIEF DESCRIPTION OF THE DRAWINGS

FIG. 3 is a side view partly in cross-section showing the buckle system in a closed configuration.

FIG. 4 is a view analogous to FIG. 3 except that the cover is opened.

FIG. 5 is a view analogous to FIG. 4 except that the lever has been moved toward an open position.

FIG. 12 is a side view showing the buckle of FIG. 8 after the tang has been released.

FIG. 13 is a side view analogous to FIG. 12 showing the cover in a closed position abutting the lever.

FIG. 14 is a view analogous to FIG. 13 except that the lever has slightly raised the cover.

FIG. 27 is a side view of an alternate configuration of the buckle system of FIG. 1 further including a pyrotechnic release mechanism.

FIG. 28 is a view analogous to FIG. 27 showing the beginning of the firing of the pyrotechnic release system.

DESCRIPTION OF THE PREFERRED EMBODIMENTS

Figure 1:
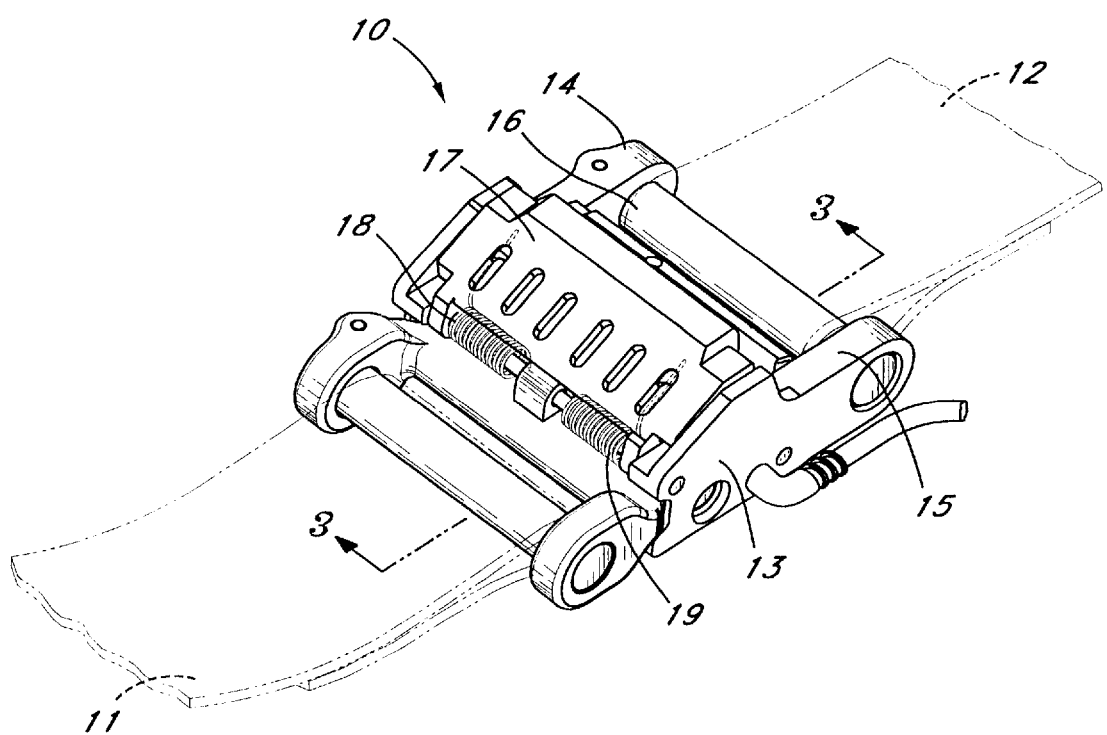
FIG.1 is a perspective view showing the exterior and right side of the buckle system of the present invention.

The buckle system of the present invention is shown in perspective view in FIG. 1 and indicated generally by reference character 10. A parachute strap 11 is shown in phantom view and a harness strap 12 is shown in phantom view on the right side of the buckle system 10.

The device, of course, is intended to hold a parachute to a harness. When the aircraft crew member reaches the ground it is important that he or she be able to immediately release the parachute from the harness so that he or she is not dragged along the ground or through water. In the past, most designs have been very difficult to open when there is a large load exerted by the parachute on the buckle system. The buckle system of the present invention eliminates this problem and provides a very easy to open and yet safe mechanism.

Buckle system 10 broadly includes a frame 13 which has a pair of arms 14 and 15. Arms 14 and 15 hold a harness loop securement pin 16. Buckle system 10 has a cover 17 which is urged into a closed position by springs 18 and 19.

Figure 2:
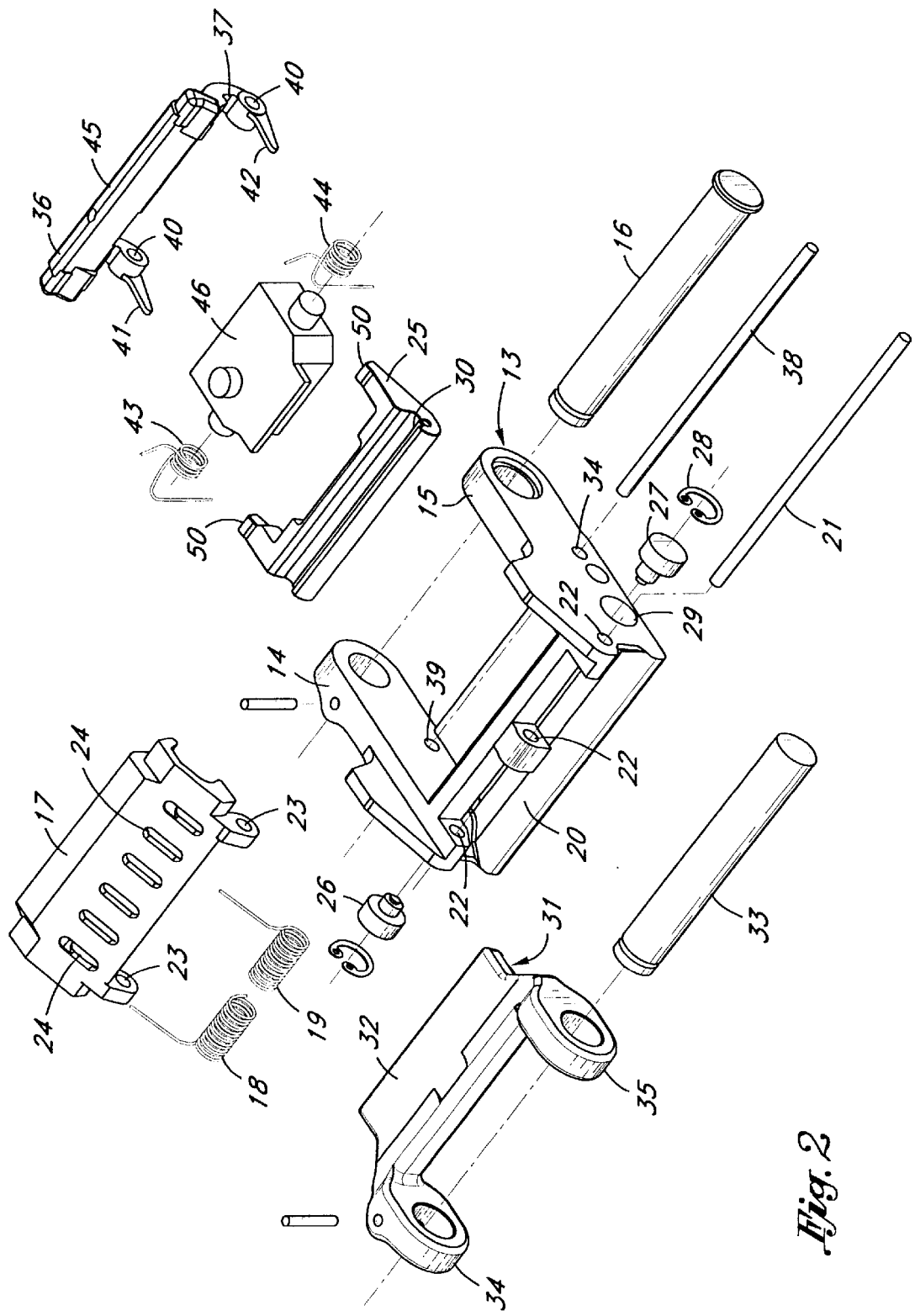
FIG. 2 is an exploded perspective view thereof.

The individual parts of the buckle system are shown in exploded in perspective view in FIG. 2 where it can be seen that frame 13 has a cross-member 20 and is made from a single piece. Cover 17 is pivotally held by cover hinge pin 21 which passes through openings 22 formed in frame 13. Hinge pin also passes through openings 23 in cover 17. Cover 17 also has oval openings 24.

Another important element of the buckle system 10 is latch 25 which is pivotally held loosely by latch hinge pins 26 and 27 which are held by shouldered screw 28 in a pair of openings, one of which is shown in FIG. 2 and indicated by reference character 29. Latch 25 has a tooth 30 which abuts the tooth 31 on tang 32. Tang 32 supports parachute strap loop securement pin 33 on its arms 34 and 35.

Another important element of the buckle system is lever 36 which holds a latch holding ledge 37. Lever 36 is pivotally held to frame 13 on lever hinge pin 38. Hinge pin 38 passes through holes 39 in frame 13 and also through holes 40 in lever 36. A pair of prybars 41 and 42 are also formed integrally on lever 36 and cause latch 25 to open even if the latch/lever springs 43 and 44 fail to do so. Lever 36 has a handle bar 45 which is grasped to open the buckle system. A pyrotechnic system 46 will be discussed below in conjunction with FIGS. 27 through 31.

An important feature of the present invention is the ease with which the system can be released. This is shown best by viewing FIGS. 3 through 8. In FIG. 3 it can be seen that latch tooth 30 securely holds tang tooth 31. It can also be seen that latch 25 is securely held against ledge 47 of cross-member 20 of frame 13. It should be noted that springs 18 and 19 urge cover 17 into a closed position. Springs 43 and 44 perform two functions. One is to urge lever 36 into a closed position and the other is to urge latch 25 into an open configuration.

It is also important to note that there are a pair of hooks 48 on cover 17 which secure lever 36 in a closed configuration. Furthermore, if cover 17 is inadvertently raised the buckle is not released since lever 36 is biased in a closed direction. Thus, to open the buckle assembly, movements in two different directions are required thereby reducing the possibility that the assembly could be inadvertently opened.

To open the buckle assembly, the first step is shown in FIG. 4 and that is the lifting of cover 17. This, of course, may be easily done since the only force holding the cover in a closed configuration is springs 18 and 19. A crew member's finger 49 is shown in phantom view indicating the direction of initial force.

Next, as shown in FIG. 5, the crew member's fingers apply load to the handlebar 45 of lever 36 which begins to pull the latch holding ledge 37 away from the free end 50 of latch 25. This, of course, also takes very little force since no matter how much force is being exerted on the parachute harness strap 11, the force transmitted between free end 50 and latch holding ledge 37 is not sufficient to make it difficult to move handlebar 45 in the direction of arrow 51.

Figure 6:
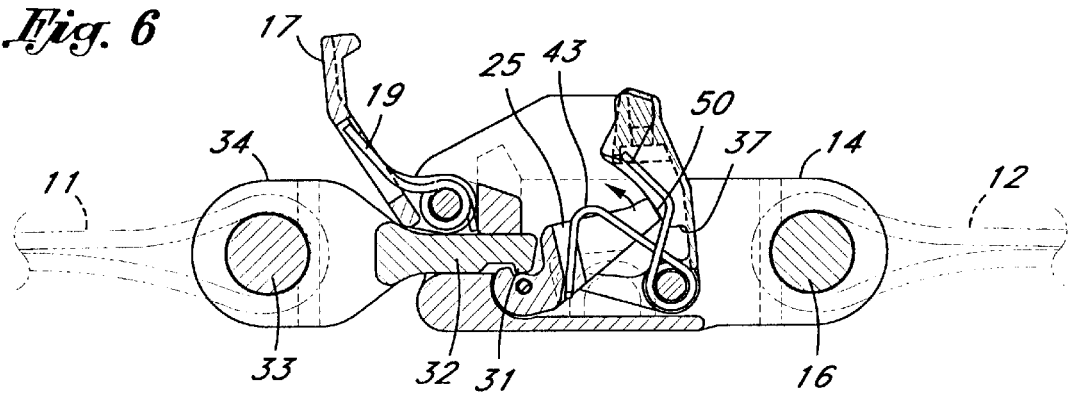
FIG. 6 is a view analogous to FIG. 5 with the lever further moved to an open position releasing the latch.
Figure 7:
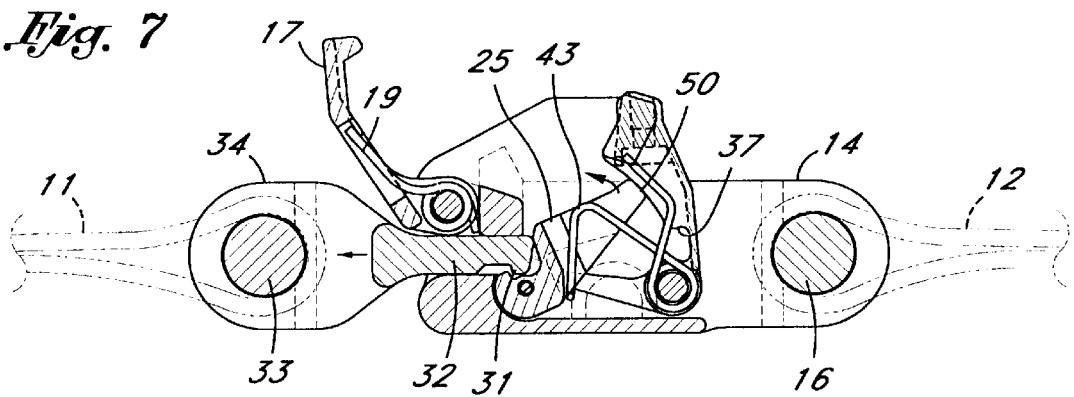
FIG. 7 is a view analogous to FIG. 6 showing the latch in a further opened configuration.
Figure 8:
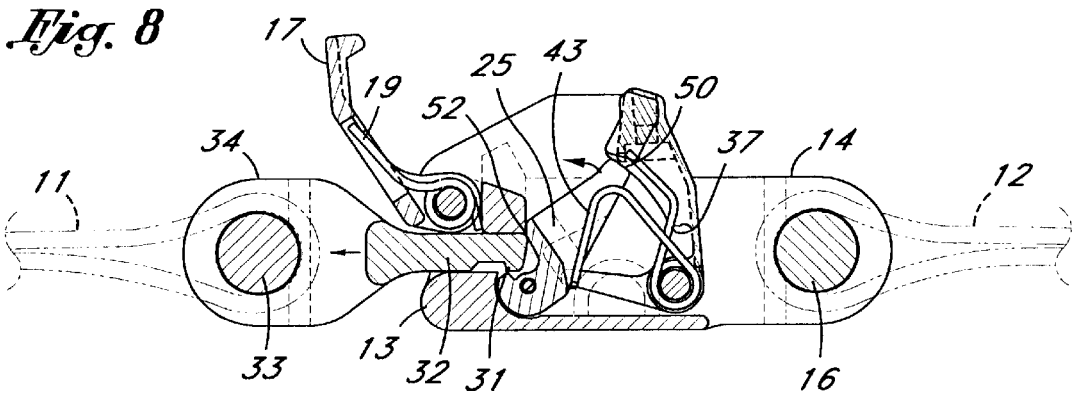
FIG. 8 is a view analogous to FIG. 7 showing the latch in a fully opened position.
Figure 9:
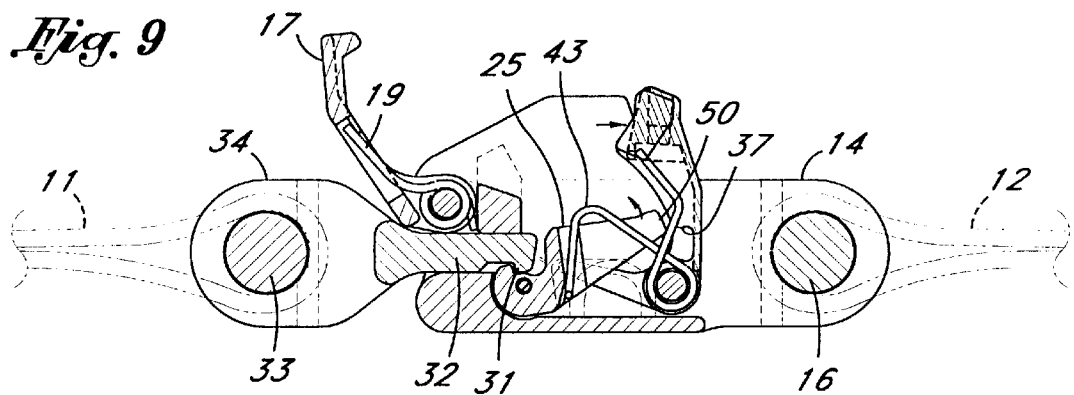
FIG. 9 is a view analogous to FIG. 6 except showing the prybar release of the latch.
Figure 10:
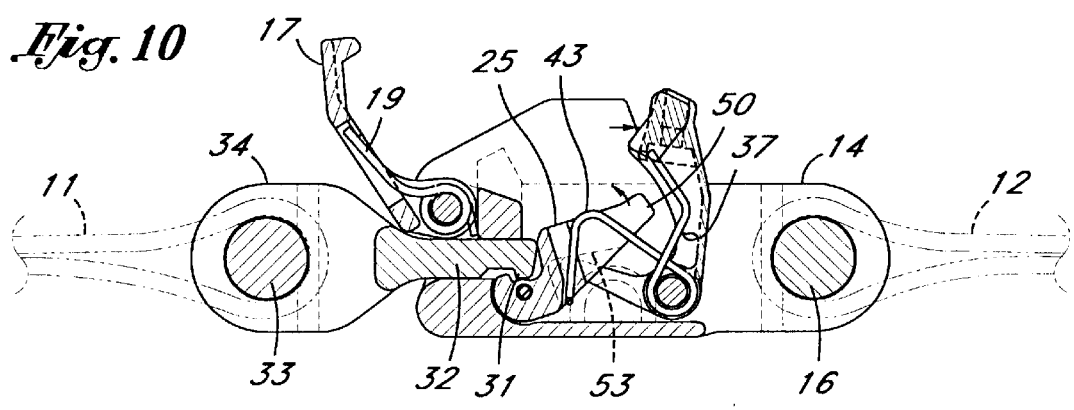
FIG. 10 is a view analogous to FIG. 9 showing the prybar in a further rotated position.

Turning now to FIG. 6, the free end 50 is completely released and the latch 25 is urged to an open position by springs 43 and 44. As this movement continues in FIG. 7, tooth 31 is almost completely released from tooth 30 of latch 25. A completely released position is shown in FIG. 8 where tang 32 may move freely out of frame 13. If for any reason tang 32 is stuck in the frame, a cam surface 52 is formed on latch 25 which helps to push the tang 32 out of frame 13. Typically, however, there is substantial force on tang 32 and it readily separates from frame 13.

Figure 11:
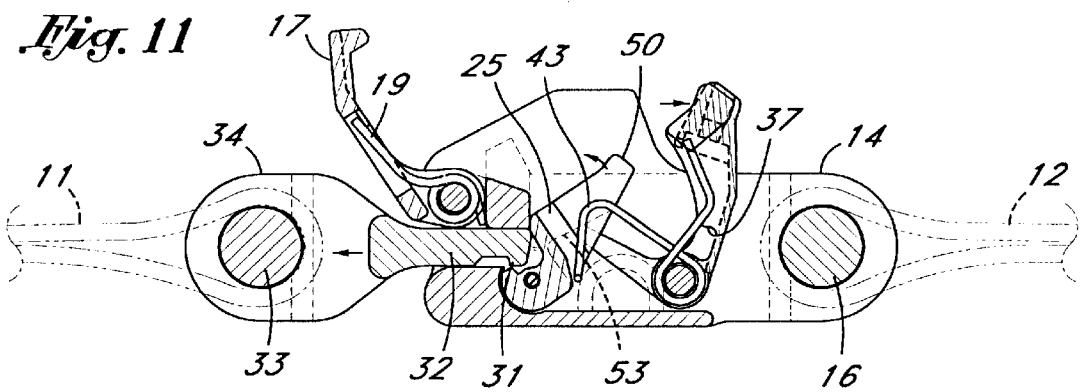
FIG. 11 is a view analogous to FIG. 10 showing the prybar in a completely opened position.

If for any reason springs 43 and 44 fail to cause free end 50 of latch 25 to move out of latch holding ledge 37, a backup is provided. That is by the contact of prybar 41 of lever 36 on a cam surface 53 of latch 25. Thus, a redundancy is provided and the latch may be released as shown in FIG. 11 even if the springs 43 and 44 are inoperative or if latch motion is restricted by dust or ice.

Another important feature of the present invention is shown in FIGS. 12 through 16. After unlatching, the cover, lever and latch are designed to move to accept the insertion of the tang for a future latching event. This needs to work equally well in two scenarios. First, when the cover is first to fall, and secondly, when the lever is first to fall. In both scenarios the final condition must be one in which the lever is held open by the cover to the desired degree so that the latch may swing freely without dragging on the lever. The need for this will become more evident as the latching sequence is explained. As shown in FIG. 12, it is assumed that cover 17 has fallen first. Next, lever 36, as shown in FIG. 13, moves toward a closed position and its cam surface 54 abuts hooks 48. Because of the shape of cam surface 54 with a valley, the cover and lever will move into a stable position as shown in FIG. 14. It is also important to note that the free end 50 of latch 25 is free to move and does not contact any part of lever 36. This is important when the tang is reinserted to facilitate the movement of the latch into a position where it may be locked under latch holding ledge 37.

Figure 15:
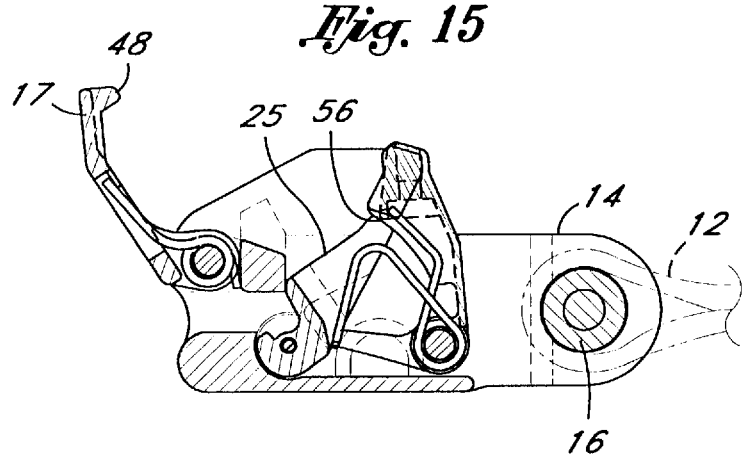
FIG. 15 is a side view analogous to FIG. 8 with the latch removed and the lever in a partly closed configuration.
Figure 16:
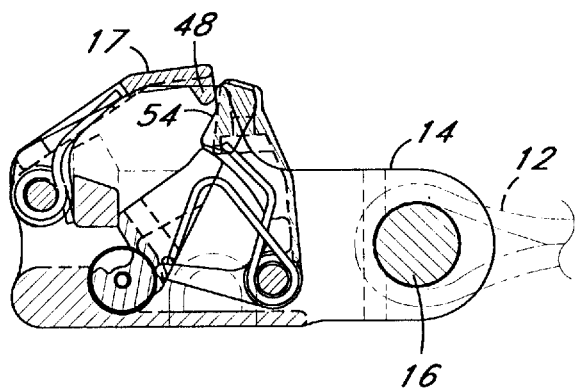
FIG. 16 is a side view analogous to FIG. 15 except that the cover has closed to contact the lever.

If the lever falls first as indicated in FIG. 15, it comes to rest on the free end 50 of latch 25. Then as the hooks 48 of cover 17 contact cam surface 54, it once again moves into the stable position shown in FIG. 14. By shifting automatically to this detented position, the buckle assembly is always in the proper condition to immediately receive the inserted tang. This is of particular interest to crews of military aircraft who must sometimes "scramble", to quickly buckle themselves into their gear and get their planes into the air. This is an improvement over existing U.S. Air Force parachute harness buckles, the lever and cover of which must be carefully shifted to the proper position.

Figure 17:
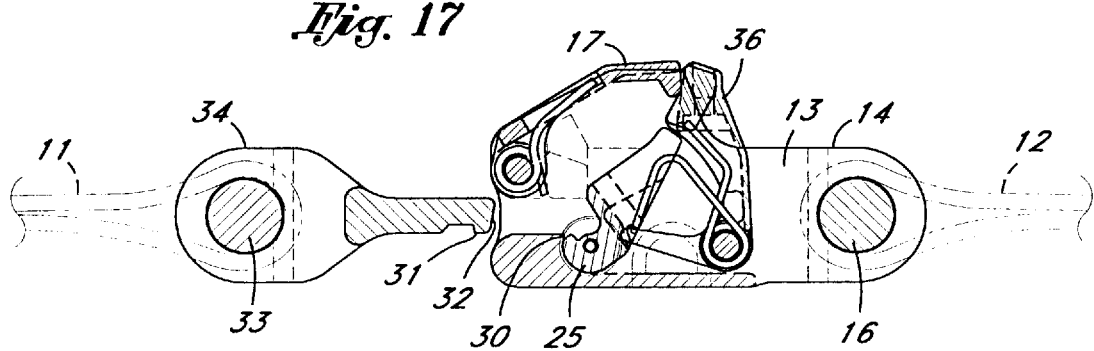
FIG. 17 is a side view showing the buckle system in a position shown in FIG. 14 with a tang being inserted into the assembly.
Figure 18:
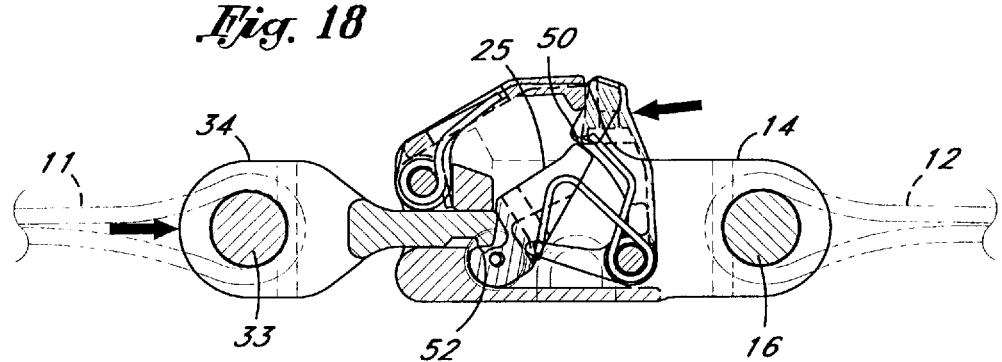
FIG. 18 is a side view analogous to FIG. 17 except that the tang is abutting the latch.
Figure 19:
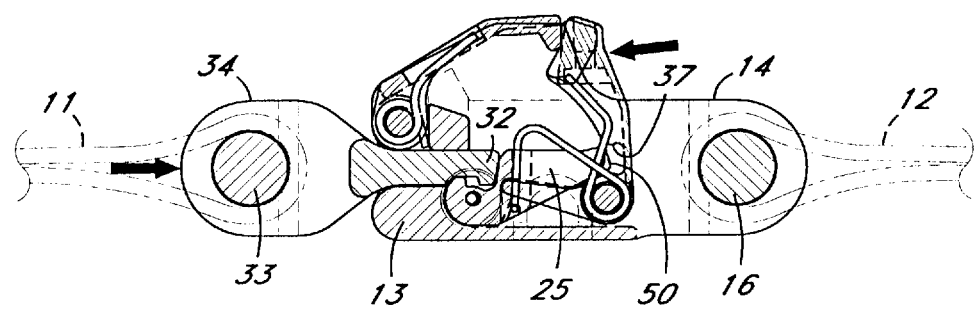
FIG. 19 is a side view analogous to FIG. 18 with the tang pushing the latch into a fully closed position.

Yet another feature of the buckle assembly of the present invention is shown in FIGS. 17, 18 and 19. "Latching" requires insertion of the tang far enough into the buckle to enable other locking events to take place. If the tang is not inserted far enough, it is ejected by the spring loaded latch. "Far enough" includes attention to all partial locking conditions which must be avoided, otherwise a "false lock" condition may occur. Many other buckles have been criticized because of even the most rare instances of "false or partial lock". Partial lock is the condition in which one or two features within a buckle engage and both are required to be engaged to develop the rated strength. In the buckle of the present invention, the tang must be over inserted, rotating the latch beyond the partial lock condition before the lever can be pushed by the crewman to the locked position. This overcomes the detented condition described above. If only one corner of one end of the latch engages with a corner on the latch holding ledge of the lever, when the crew member takes his hand off of the buckle, the cover and lever will return to their detented condition, releasing the latch and ejecting the tang. The crew member is thus instantly alerted that his attempts at buckling the device have not been completed. The tang can be inserted into the buckle with one hand—either hand. The fingertips pull on the tang while the heel of the hand presses against the lever of the buckle. The equal and opposite forces of 4.4 lbs. are a result of the selection of the preloaded springs to provide a comfortable magnitude for most people. The protection against false latch is shown in FIGS. 17, 18 and 19 where tang 32 is shown outside of the frame 13. In FIG. 18, the tang begins to contact the cam surface 52 of latch 25. This causes the free end 50 to begin to move towards the latch holding ledge 37. If the insertion is interrupted just at the position shown in FIG. 19, the biased movement of latch 25 will cause cam surface 52 to push tang 32 out of frame 13, thus making it very clear that no latch has occurred.

To properly complete the latching procedure, a 9 lb. force is pressed between the tang 32 and the lever 36. This causes the cam surface 54 to contact hooks 48 and begin to raise the cover 17. Further movement to the position shown in FIG. 1 causes the lever 36 to move cover 17 out of the way and to move into a position where the latch holding ledge 37 captures the free end 50 of latch 25.

Figure 20:
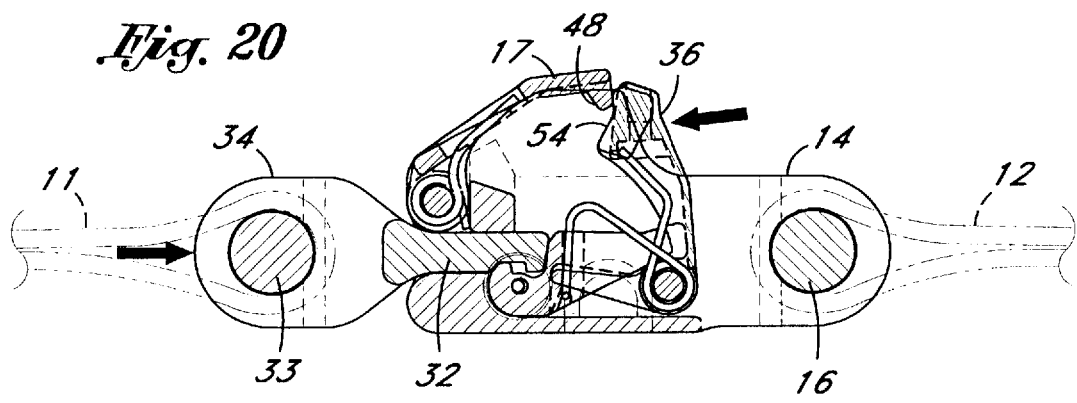
FIG. 20 is a side view analogous to FIG. 19 showing the effect of pressure on the lever beginning to lift the cover.
Figure 21:
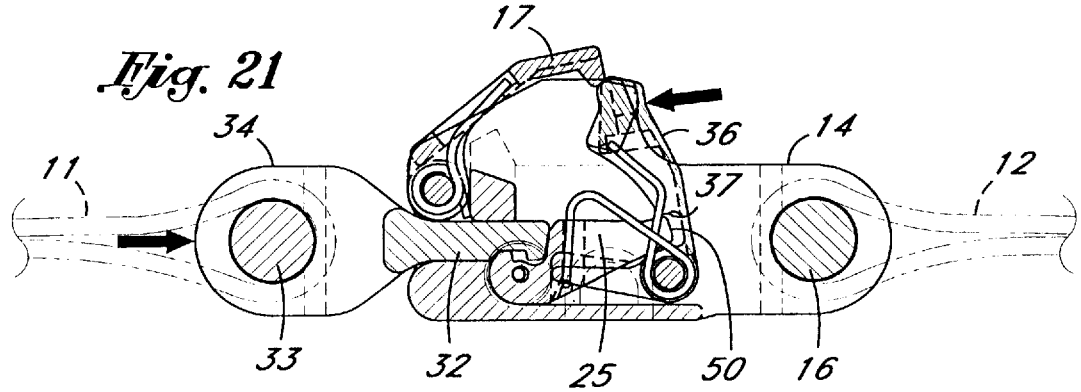
FIG. 21 is a side view analogous to FIG. 20 with the lever fully lifting the cover.
Figure 22:
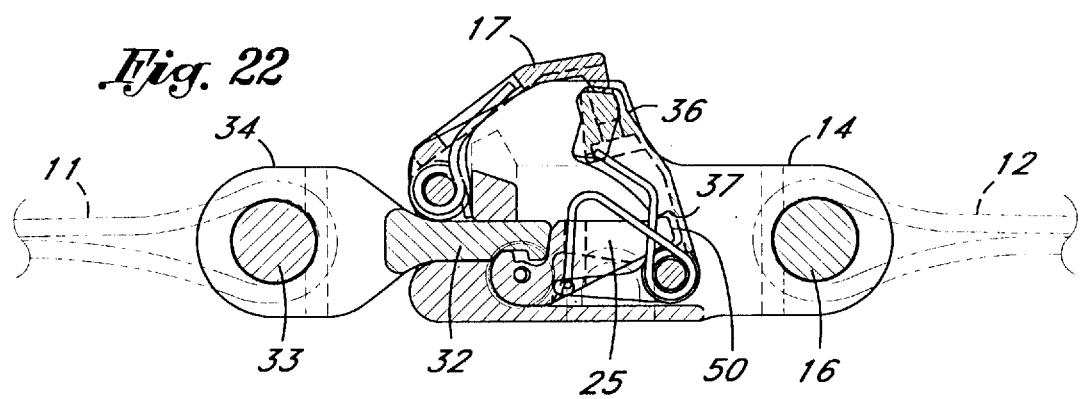
FIG. 22 is a side view showing the lever in a further closed position.
Figure 23:
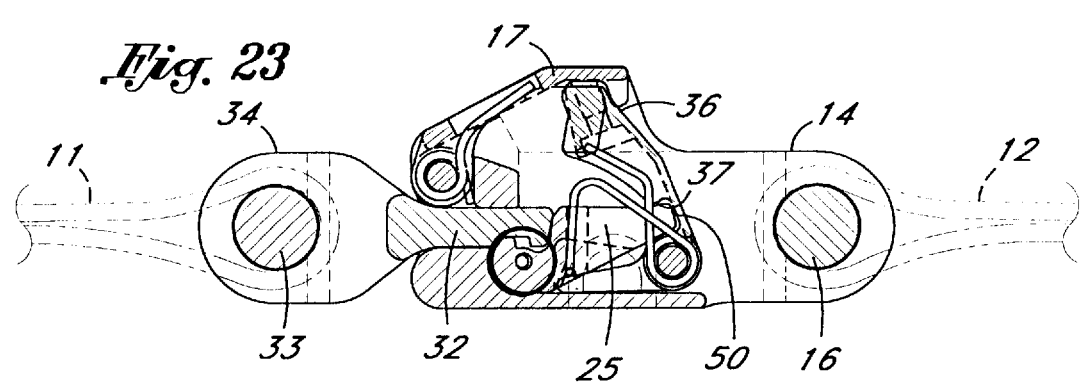
FIG. 23 is a side view analogous to FIG. 22 showing the buckle assembly in a fully closed configuration.
Figure 24:
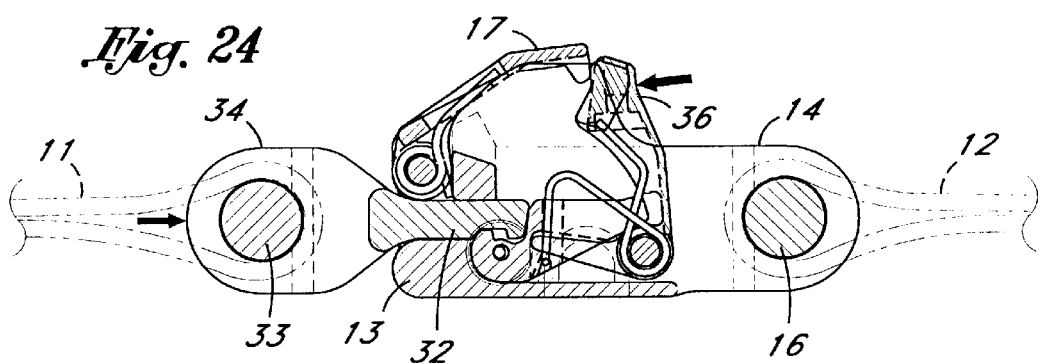
FIG. 24 is a side view showing the effect of partial insertion of the tang.
Figure 25:
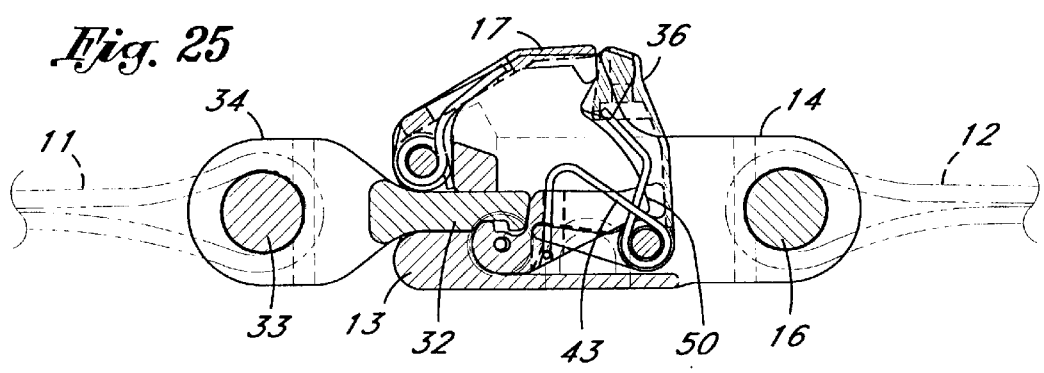
FIG. 25 shows the effect of release of insertion of pressure on the device of FIG. 24.
Figure 26:
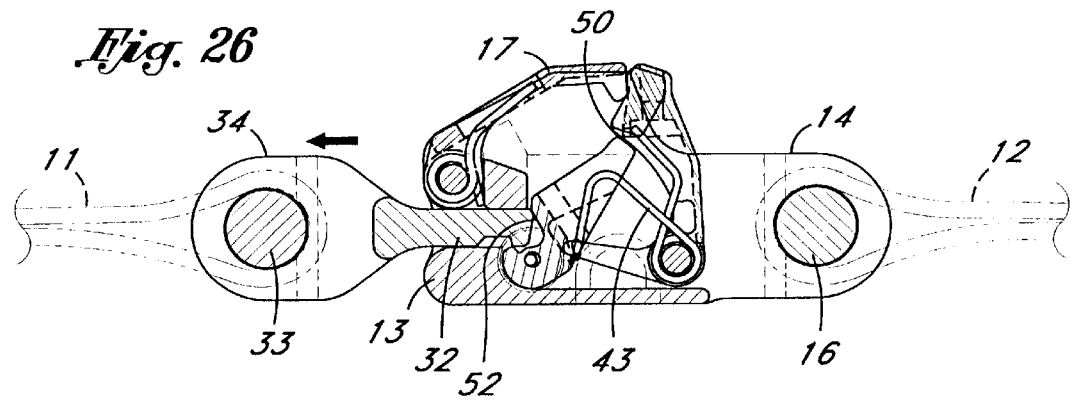
FIG. 26 shows the tang pushed out of the buckle to eliminate a false latch configuration.
Figure 29:
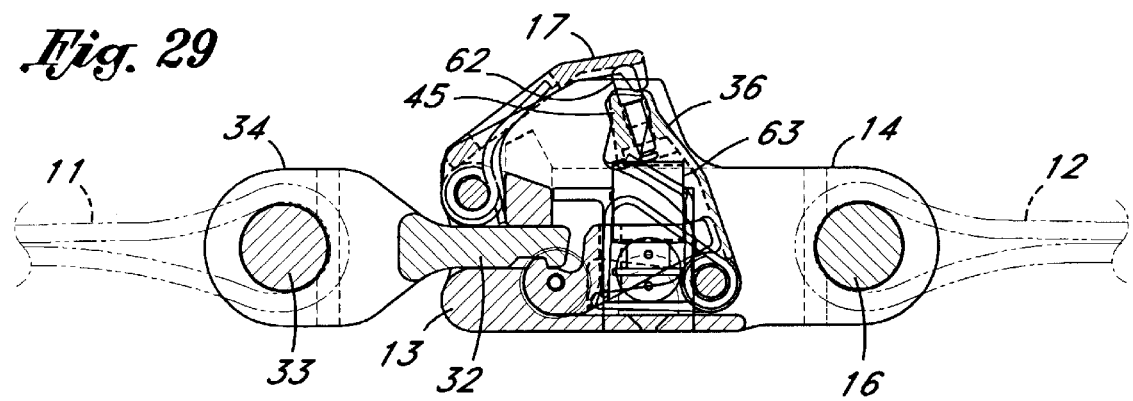
FIG. 29 is a side view analogous to FIG. 28 showing the pyrotechnic piston in a further extended position.

In FIG. 22, the springs which are urging the cover 17 in a closed configuration, the lever 36 to a closed configuration cause the assembly to move into a fully closed configuration shown in FIG. 23. Until the cover has moved over the lever, the latching process is not complete. The rejection of the latch is shown clearly in FIGS. 24, 25 and 26 where the force of closing is interrupted after the position shown in FIG. 20. This causes a 4.4 lb. force to push the tang back out. First, the spring returns the cover to the nested position shown in FIG. 25. This is the stable position as discussed leading to the position of FIG. 14. Then the lever no longer touches the free end 50 and the springs 43 and 44 urge the latch upwardly to the position shown in FIG. 26 and the cam surface 52 contacts tang 32 forcing it out of frame 13, making it clear that no latch has occurred.

The buckle system of the present invention may be readily converted to an automatic opening configuration without significantly adding to the dimensions of the assembly. A pyrotechnic modification is shown in FIGS. 27 through 31. The pyrotechnic device 60 has a cylinder 61 held in frame 13. A pin 62 is loosely held in the handle 45 of lever 36. This pin 62 is preferably biased downwardly so that it does not normally interfere with the operation of the device. When the pyrotechnic device 60 is fired, the piston 63 starts to extend as shown in FIG. 28. The first thing it contacts is pin 62 which lifts through handle 45 and contacts the underside of cover 17 causing the hook 48 to clear the handlebar 45 of lever 36.

Figure 30:
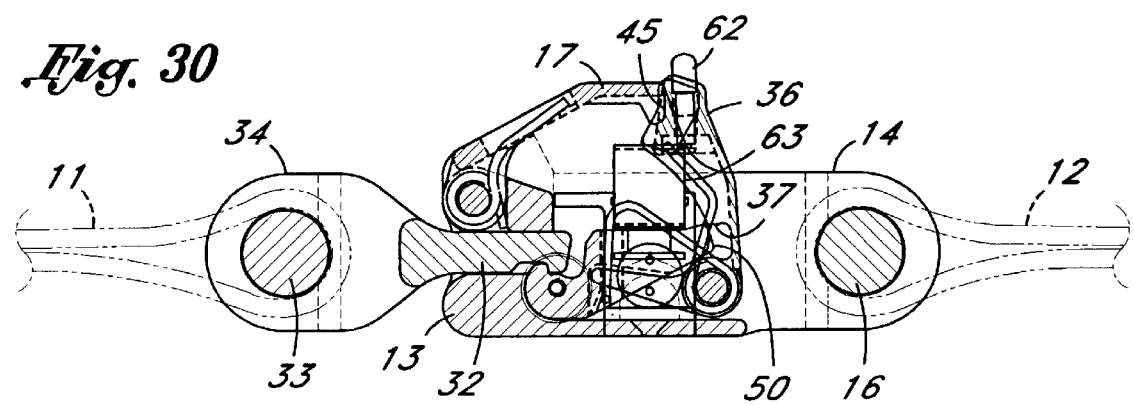
FIG. 30 is a side view analogous to FIG. 29 showing the pyrotechnic device in a further extended position.
Figure 31:
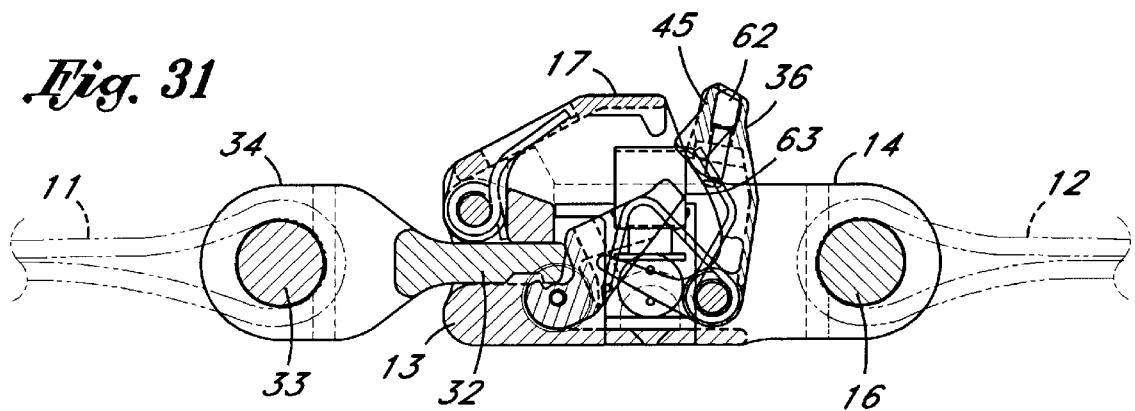
FIG. 31 is a side view analogous to FIG. 30 except that the pyrotechnic device is in a fully extended position.

Then, as the piston continues to rise, it contacts the underside of lever 36 and causes it to move rearwardly. As shown in FIG. 30, the piston has almost released the remote end 50 from under ledge 37. As the piston continues to rise as shown in FIG. 1, the tang 32 is completely released. The detonation of the pyrotechnic device may be commanded by a water sensor. The pyrotechnic device of the present invention adds very little to the weight of the buckle system. Prior art devices have operated typically in a different manner and typically have released a pin, thus, opening the buckle system in an entirely different manner requiring an entirely different release mechanism, thereby adding to the weight and complexity of the assembly.

Buckles of the present invention must withstand an ultimate load of 9,000 lbs. The construction of the buckle of the present invention is such that the tang, having a very wide tooth, contacts the wide tooth on the latch and force merely moves the tooth 30 of the latch against the ledge 47 of frame 13, thus providing a very strong system.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A buckle system for release of a harness, said buckle system including a harness loop securement pin and a parachute loop securement pin, said buckle system comprising:

a frame having two arms and a cross member, said two arms holding said harness loop securement pin;

a lever having a pivoted end and a free end, said lever being pivotally held to said frame and movable from a closed position to an open position, said lever being biased toward a closed position, said lever having a latch holding ledge;

a latch having a pivoted end and a free end, said latch being pivotally held to said frame and movable from a closed position to an open position and said latch being positioned so that its free end fits under said latch holding ledge of said lever when said latch and said lever are in the closed position and said latch has a tang holding tooth which is rotated into a closed position when said latch is in a closed position, the direction of rotation of said lever to an open position being opposite of the direction of rotation of said latch to an open position and said latch being continuously biased toward an open position; and a tang assembly having a pair of arms which hold the parachute strap loop securement pin and a cross member, said cross member of said tang assembly including a tang, shaped to be held by said tang holding tooth of said latch whereby when said tang is held by said tang holding tooth, said latch is in a closed position, and said lever is in a closed position, said tang assembly is securely held to said frame but when said lever is moved to an open position, the latch is urged to move out of said latch holding ledge as a result of said latch being biased toward an open position and move to an open position and release said tang.

2. The buckle system for release of a harness of claim 1 further including a cover having a pivoted end and a free end, said cover being pivotally held to said frame and movable from a closed position to an open position, said cover being biased toward said closed position, said cover and said lever being held on said frame so that the cover covers said lever but when said cover is moved to an open position, the lever is exposed and may be moved from its closed position to its open position but when said cover is covering said lever, the lever may not be moved from its closed position.

3. The buckle system for release of a harness of claim 2 wherein said cover and said lever open in opposite directions so that any one accidental contact cannot cause an inadvertent release.

4. The buckle system for release of a harness of claim 1 wherein said latch is held against releasing said tang by said cross member of said frame.

5. The buckle system for release of a harness of claim 4 wherein said latch is also pivotally held by at least one pin loosely restraining said latch while permitting it to move between an open position and a closed position.

6. A buckle system for release of a harness, said buckle system including a harness loop securement pin and a parachute loop securement pin, said buckle system comprising:

a frame having two arms and a cross member, said two arms holding said harness loop securement pin;

a cover having a pivoted end and a free end, said cover being pivotally held to said frame and movable from a closed position to an open position, said cover being biased toward said closed position;

a lever having a pivoted end and a free end, said lever being pivotally held to said frame and movable from a closed position to an open position, said lever being biased toward a closed position, said lever having a latch holding ledge, said cover and said lever being held on said frame so that the cover covers said lever but when said cover is moved to an open position, the lever is exposed and may be moved from its closed position to its open position but when said cover is covering said lever, the lever may not be moved from its closed position;

a latch having a pivoted end and a free end, said latch being pivotally held to said frame and movable from a closed position to an open position and said latch being positioned so that its free end fits under said latch holding ledge of said lever when said latch and said lever are in the closed position and said latch has a tang holding tooth which is rotated into a closed position when said latch is in a closed position, the direction of rotation of said lever to an open position being opposite of the direction of rotation of said latch to an open position, said latch being biased toward an open position; and a tang assembly having a pair of arms which hold the parachute strap loop securement pin and a cross member, said cross member of said tang assembly including a tang, shaped to be held by said tang holding tooth of said latch whereby when said tang is held by said tang holding tooth, said latch is in a closed position, and said lever is in a closed position, said tang assembly is securely held to said frame but when said lever is moved to an open position, the latch is urged to move out of said latch holding ledge as a result of said latch being biased toward an open position and move to an open position and release said tang.

7. The buckle system for release of a harness of claim 6 wherein said tang holding tooth of said latch further includes a cam surface positioned so that as the latch moves into a position to release the tang, the cam surface abuts the tang and, upon further movement, ejects the tang out of the tang holding tooth.

8. The buckle system for release of a harness of claim 7 wherein said cover abuts a stop as it moves slightly past its closed position and said lever abuts said free end of said latch when said latch is in its open position and the free end of said lever and the free end of said latch are shaped so that the cover moves the lever slightly out of contact with the latch to facilitate the movement of the latch to a closed position during the insertion of the tang into the tang holding tooth.

9. The buckle system for release of a harness of claim 8 wherein said cam surface of said tang holding tooth abuts an inserted tang thereby moving said latch toward a closed position as said tang is inserted but if said lever is not pushed into a closed position when said latch is under said latch holding ledge, the cam surface of said latch will push the inserted tang outwardly thereby preventing a false latch.

10. The buckle system for release of a harness of claim 8 wherein the free end of the lever and the free end of the cover are shaped so that as the lever is pushed toward a closed position, it will rotate the cover upwardly and permit the lever to move beneath the cover.

11. The buckle system for release of a harness of claim 6 further including a pry bar positioned on said lever, said pry bar being positioned under said latch so that if said latch fails to move as a result of being biased toward an open position, the pry bar contacts said latch as said lever is moved into an open position thereby providing a further assurance that the latch will release the tang.

12. The buckle system for release of a harness of claim 6 wherein said lever and said latch are biased by two springs and each of said two springs biases both the lever and the latch.

13. The buckle system for release of a harness of claim 6 wherein said tang holding tooth extends the full width of the latch.

14. The buckle system for release of a harness of claim 13 wherein said tang extends the full width of the latch.

15. The buckle system for release of a harness of claim 6 further including a pyrotechnic unlatching assembly comprising:

a pyrotechnic cylinder held by said frame and positioned under said lever, said cylinder containing a piston which moves toward the free end of said lever when a pyrotechnic charge within said cylinder is detonated, said piston being positioned so that as it moves out of said cylinder it will first lift the cover, then contact said lever whereby when said pyrotechnic charge is detonated, the piston will move out of the cylinder contacting the lever moving it to an open position thereby moving the latch into an open position and releasing the tang.

16. The buckle system for release of a harness of claim 15 further including a pin extending through the free end of said lever, said pin being of sufficient length to extend below said free end and said pin being movable so that an outer end of said pin can be moved beyond said free end of said lever, said pin being positioned so that it will contact said piston as it moves upwardly thereby initializing a movement of said cover from its closed position toward its open position.

* * * * *